A. J. COLWELL.
MACHINE FOR MAKING CIGARS.
APPLICATION FILED MAR. 1, 1919.

1,303,855.

Patented May 20, 1919.
5 SHEETS—SHEET 1.

Inventor:
Allen J. Colwell
By Horatio E. Bellows
Attorney;

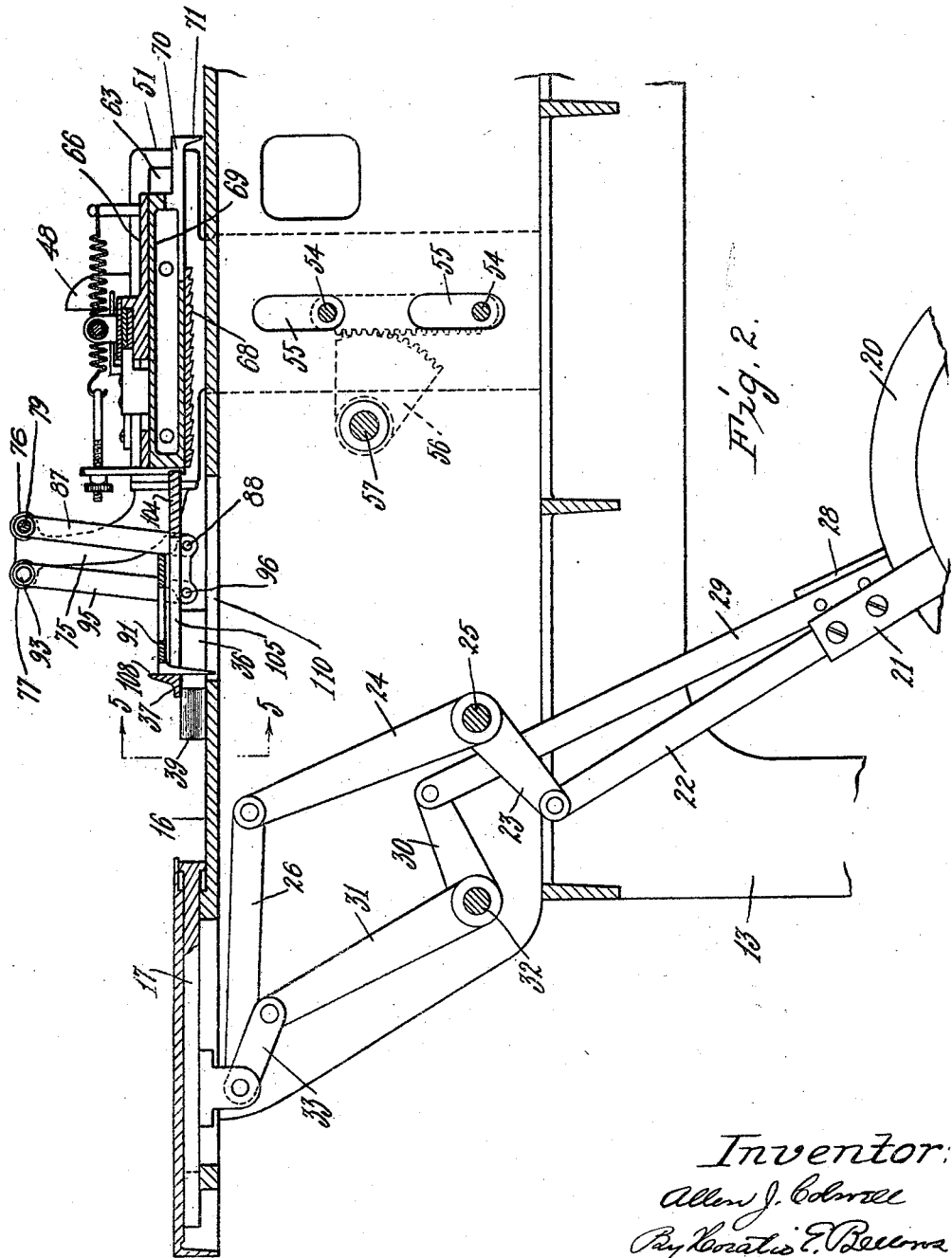

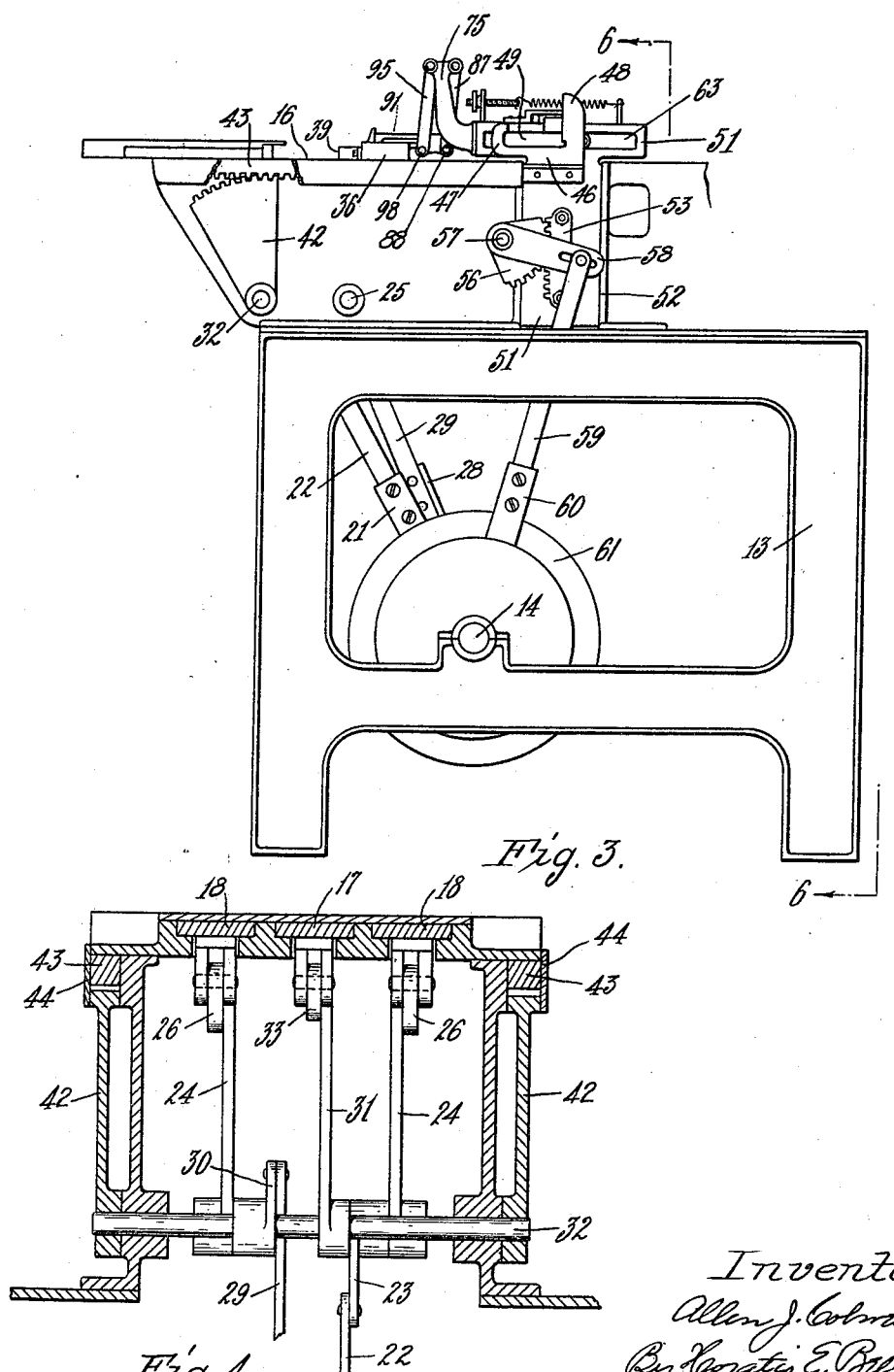

A. J. COLWELL.
MACHINE FOR MAKING CIGARS.
APPLICATION FILED MAR. 1, 1919.

1,303,855.

Patented May 20, 1919.
5 SHEETS—SHEET 4.

Inventor,
Allen J. Colwell
By Horatio E. Bascom
Attorney.

A. J. COLWELL.
MACHINE FOR MAKING CIGARS.
APPLICATION FILED MAR. 1, 1919.
1,303,855.
Patented May 20, 1919.
5 SHEETS—SHEET 5.
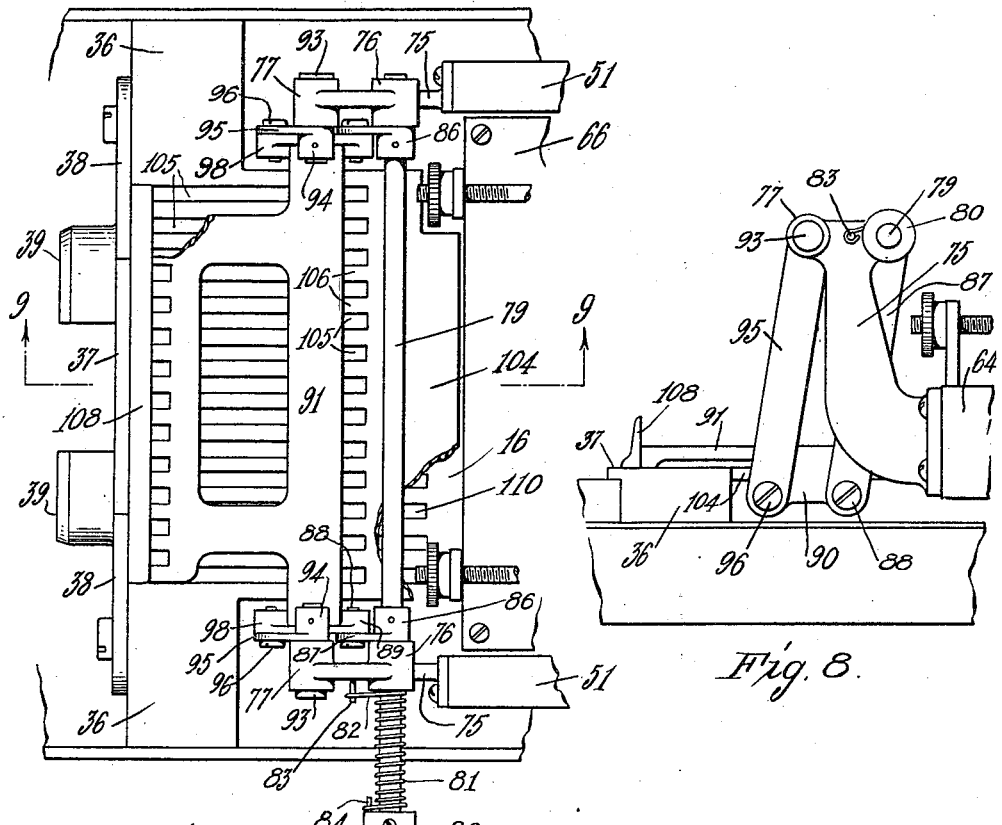
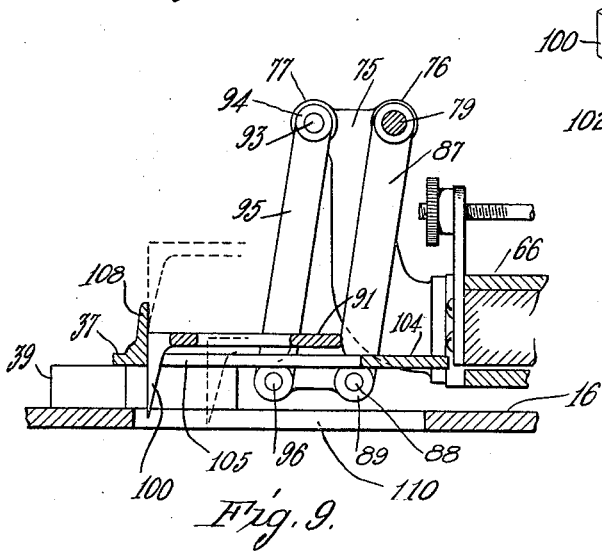
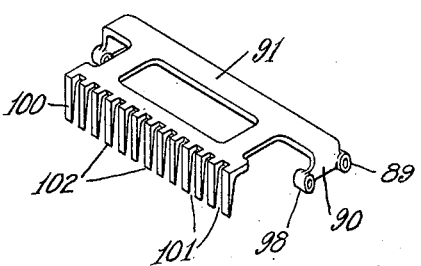
Inventor.
Allen J. Colwell
By Horatio E. Bellows
Attorney

UNITED STATES PATENT OFFICE.

ALLEN J. COLWELL, OF PROVIDENCE, RHODE ISLAND, ASSIGNOR TO COLWELL CIGAR MACHINE COMPANY, INCORPORATED, A CORPORATION OF DELAWARE.

MACHINE FOR MAKING CIGARS.

1,303,855.  Specification of Letters Patent.  Patented May 20, 1919.

Application filed March 1, 1919. Serial No. 280,014.

*To all whom it may concern:*

Be it known that I, ALLEN J. COLWELL, a citizen of the United States, residing at Providence, in the county of Providence and State of Rhode Island, have invented certain new and useful Improvements in Machines for Making Cigars, of which the following is a specification.

My invention relates to cigar bunching machines, and particularly to the mechanism for maintaining the transversely disposed strips in parellelism during their travel from the cutting mechanism to the carriage. It has been attempted to do this by means of a depending vibratory plate pivoted at its top corners, but the inclination of the plate at the point of its advance oscillation has made its grip and control of the strips uncertain.

The essential objects of my invention are to correct this fault; to provide for the escape of waste leaf from the surface of the table; and to attain these ends in a simple and effective structure.

To these ends essentially my invention consists in the construction, combination, and mode of operation of parts set forth and falling within the scope of the claims hereto appended.

Figure 1:
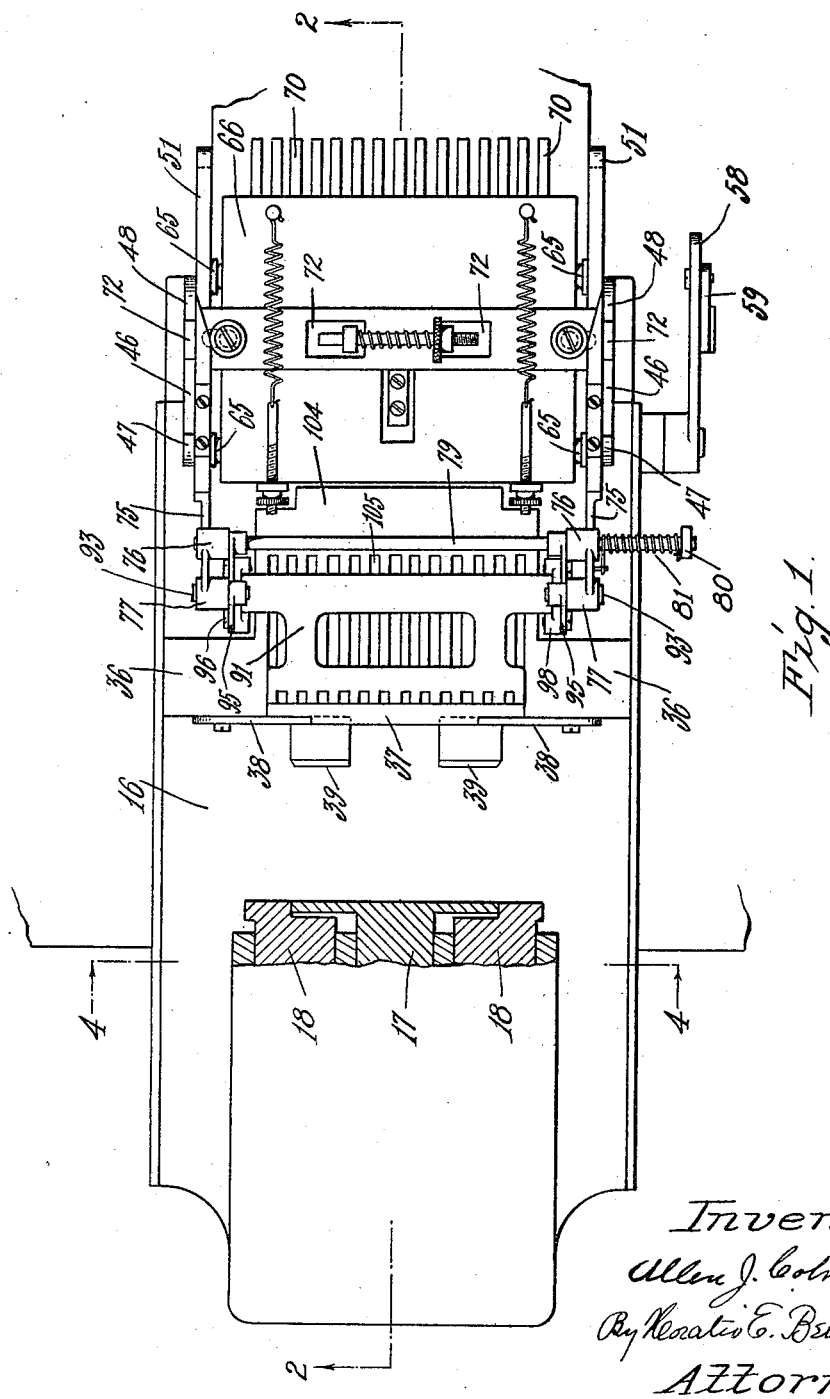
Figure 5:
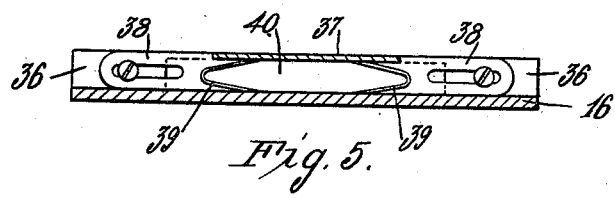
Figure 6:
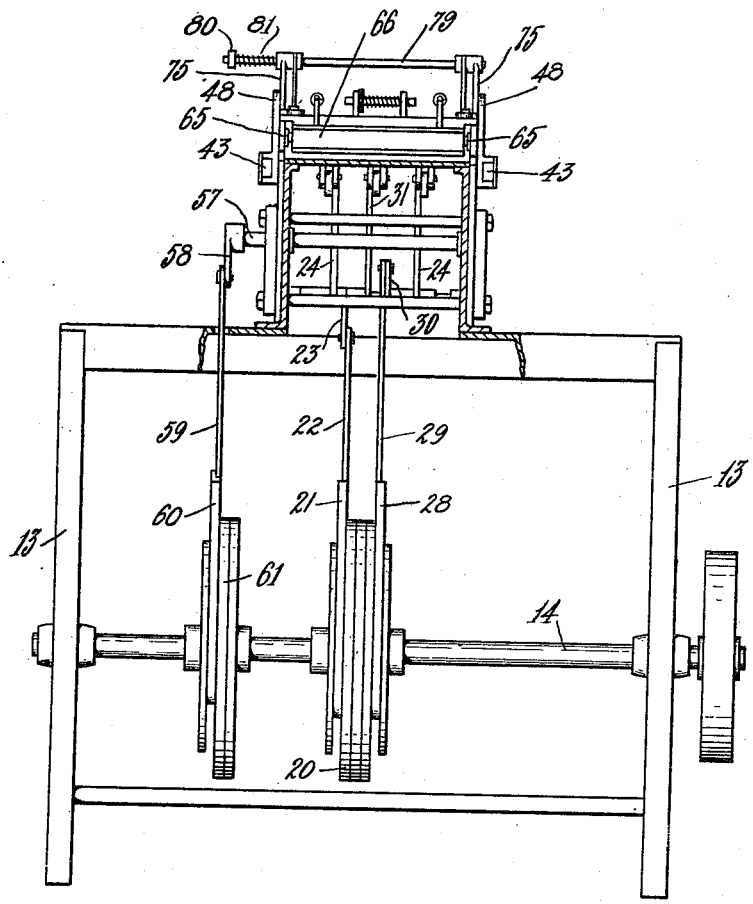

In the accompanying drawings illustrating the principle of this invention and the best mode now known to me for applying that principle, Figure 1, is a fragmentary plan view of a cigar bunching machine embodying my invention the illustrated machine being of the type set forth in my prior Patent No. 1,231,132 issued June 26, 1917, Fig. 2, a section on line 2—2 of Fig. 1, Fig. 3, a side elevation of the same, Fig. 4, a section on line 4—4 of Fig. 1, Fig. 5, a section on line 5—5 of Fig. 2, Fig. 6, a section on line 6—6 of Fig. 3, Fig. 7, an enlarged plan view of my novel paralleling mechanism, Fig. 8, a side elevation of the same, Fig. 9, a section on line 9—9 of Fig. 7, and Fig. 10, a perspective view of the paralleling plate detached.

Like reference characters indicate like parts throughout the views.

In the construction illustrated 13 is the frame, and 14 the driving shaft. On the floor or run 16 slide the shearing plunger 17 and side plungers 18. The latter are reciprocated by the cam 20 on shaft 14 through fork 21, rod 22, levers 23 and 24 on rock shaft 25, and link 26. The plunger is driven from cam 20 through fork 28, rod 29, levers 30 and 31 on rock shaft 32, and link 33.

The cutter abutment comprises the blocks 36, bridge 37, cutter plates 38, and the semi-elliptical blades 39 forming the space 40 to receive the cutter plunger 17 which severs and advances the strips therethrough.

The latter are further advanced along the run or bed thus. The rock shaft 32 carries segments 42 engaging rack bars 43 in guides 44 on the sides of the bed. Rigid with each of these bars are plates 46 with an end finger 47 and end lug 48 bounding a horizontal slot 49. Plates 51, adjacent plates 46, are slidable in guides 52 and vertically reciprocated by racks 53, held tightly against the plates 51 by the tie rods 54 in slots 55, and engaged by segments 56 on rock shaft 57 actuated through arm 58, rod 59, fork 60 and cam 61, by shaft 14.

In horizontal slots 63, in the plates 51, slide guide studs 65 upon the sides of a frame or carriage 66 having transversely disposed series of teeth 68 on its bottom face. This frame carries a yielding frame 69 with fingers 70 and prongs 71. Yielding laterally projecting members 72 mounted in the top of the frame 66 extend into the planes of the fingers 47 and 48. The horizontal movement of the contact plates 46 and the vertical movement of the carrier plates 51 combine to move the carrier frame 66 in a rectangular path. The fingers 47 by contact with the members 72 advance the frame to carry forward along the bed the tobacco strips. Next the plates 51 elevate the frame. Thereafter the lugs 48, engaging members 72, move the frame to its rearward limit, and the descent of the plates 51 lowers the frame to original position. These movements advance the tobacco strips along the run to the bunching mechanism.

The tobacco strips after their projection by the plunger 17 through the blades 39 emerge out of parallelism, and it is vitally important that these strips forthwith assume parallelism before they are engaged by the teeth 68 of the feed frame 66. The mechanism for performing this function is as follows.

Fast to plates 51 are rearwardly directly upwardly inclined arms 75. In the top of each arm are two bearings 76 and 77 spaced from and in horizontal alinement with each other. In bearings 76 is journaled a rod 79 with a projecting portion having fast to its end a collar 80, and around which is a helical spring 81 with its ends abutting against the collar and one arm 75, and having one end 82 engaging a pin 83 in said arm, and its other end engaging a pin 84 in the collar. Fast to the rod are collars 86 integral with depending arms or links 87, in whose lower ends are pivot members 88 loosely engaging bearings 89 in depending portions 90 upon the ends of the rear portion of a frame 91. Loose in bearings 77 is a rod, rods, or studs 93 fast to collars 94 integral with depending arms or links 95 having pivot members 96 loose in their ends loosely engaging bearings 98 in the portions 90 of the frame. The bearings 89 and 98 are in longitudinal alinement. The plate 91 is substantially rectangular and has upon its rear edge a depending vertically disposed lip 100, which in the present instance happens to have slots 101 forming vertical fingers 102.

The plate yields somewhat as the plunger 17 advances the strips, resisted by the spring 81. This resistance disposes the strips in parallelism. The strips are prevented from overriding each other by a plate 104 integral with the bridge 37, parallel with the bed 16, and terminating adjacent the carriage. The plate has longitudinal slots 105 forming parallel bars 106 terminating adjacent an abutment 108. When a plate 104 is present the slots 101 of the lip 100 permit the latter to descend below the plate 104.

In operation as the plates 51 descend the lip 100 descends adjacent the abutment 108 toward or to the bed 16 behind the tobacco strips, whereupon the plunger 17 advances the strips against the vertical member 100, and after this advance the plates 51 elevate the member 100 above the path of the strips. The mounting of the plate 91 is such that regardless of the angles of the arms 87 and 95 the plate is perfectly horizontal, and the lip teeth 102 are always exactly vertical. At no position of the plate 91 is the lip 100 inclined relatively to the bed 16, hence there is no period of the movement of the plate 91 during which the strips can accidentally escape the operation of the member 100.

In order to keep the bed of the machine clean and, if desired, recover any fragments of tobacco broken from the strips during the plunger cutting operation, the bed or run 16 is provided with longitudinal slots 110 below the plate 104 in vertical alinement with the slots 105. Through the slots 110 the tobacco fragments fall away from the bed, and into any receptacle placed under the bed. In their forward swing the fingers 102 describe a slight arc varying the height of the fingers at various points of the arc as shown in broken lines in Fig. 9. Hence when slots 110 are present in the bed the lip is able to swing in a lower plane and nearer the bed than otherwise, which increases the effectiveness of the paralleling operation.

I claim:—

1. In a machine of the type set forth, the combination with a run, of a reciprocating shearing plunger mounted upon the run to advance tobacco strips, vertically reciprocating plates mounted upon the sides of the run, arms carried by the plates, a horizontally reciprocating plate depending from the arms in front of the plunger, a lip on the plate disposed at right angles to the plate in the path of the strips, means for maintaining the plate in constant parallelism with the bed, means for reciprocating the plunger, and a driving shaft actuating the plunger reciprocating means for operating the first mentioned plates.

2. In a machine of the type set forth, the combination with a run, of a reciprocating shearing plunger mounted on the run adapted to advance tobacco strips along the run, means for reciprocating the plunger, plates upon the sides of the run, arms on the plates, a swinging plate, links supported by the arms pivotally engaging the plate, and a lip on the plate and at right angles thereto in front of the plunger in the path of the strips.

3. In a machine of the type set forth, the combination with a run, of a reciprocating shearing plunger mounted on the run adapted to advance tobacco strips along the run, means for reciprocating the plunger, plates on the sides of the run, arms carried by the plates, a horizontally reciprocating plate, pairs of links supported by each arm engaging the plate, and a lip on the plate at right angles to the run in front of the plunger in the path of the strips.

4. In a machine of the type set forth, the combination with a run, of a reciprocating plunger on the run adapted to advance tobacco strips along the run, means for reciprocating the plunger, plates on the sides of the run, arms carried by the plates, a shaft journaled in the arms, other shafts journaled in the arms in horizontal alinement with the first shaft, a helical spring on one shaft engaging one arm, links fast to all the shafts, a horizontal plate, pivot members in horizontal alinement with each other connecting all the links with the sides of the plate, and a lip on the plate at right angles to the plate and to the run in advance of the plunger and in the path of the strips.

5. In a machine of the type set forth, the combination of a run provided with a series of longitudinal slots, a fixed guide plate above the run provided with longitudinal slots, a reciprocating shearing plunger mounted on the run adapted to advance tobacco strips along the run, means for reciprocating the plunger, plates on the sides of the run, arms on the plates, a swinging plate depending from the arms above the guide plate, and teeth on the plate in front of the plunger in the path of the strips and adapted to register in the slots of both the guide plate and the run.

In testimony whereof I affix my signature.

ALLEN J. COLWELL.